United States Patent
Ulrich

(10) Patent No.: US 7,440,915 B1
(45) Date of Patent: Oct. 21, 2008

(54) METHOD, SYSTEM, AND COMPUTER-READABLE MEDIUM FOR REDUCING PAYEE FRAUD

(75) Inventor: Glen Ulrich, Happy Valley, OR (US)

(73) Assignee: U.S. Bancorp Licensing, Inc., Minneapolis, MN (US)

( * ) Notice: Subject to any disclaimer, the term of this patent is extended or adjusted under 35 U.S.C. 154(b) by 0 days.

(21) Appl. No.: 11/941,636

(22) Filed: Nov. 16, 2007

(51) Int. Cl.
G06Q 40/00 (2006.01)

(52) U.S. Cl. .......................................... 705/35; 705/30

(58) Field of Classification Search ............... 705/30–44
See application file for complete search history.

(56) References Cited

U.S. PATENT DOCUMENTS

| | | | |
|---|---|---|---|
| 5,679,940 A * | 10/1997 | Templeton et al. .......... 235/380 |
| 5,956,700 A | 9/1999 | Landry |
| 6,181,814 B1 | 1/2001 | Carney |
| 6,330,546 B1 | 12/2001 | Gopinathan et al. |
| 6,418,436 B1 | 7/2002 | Degen et al. |
| 6,535,728 B1 | 3/2003 | Perfit et al. |
| 6,714,918 B2 | 3/2004 | Hillmer et al. |
| 6,957,770 B1 | 10/2005 | Robinson |
| 7,107,243 B1 | 9/2006 | McDonald et al. |
| 7,139,731 B1 | 11/2006 | Alvin |
| 7,246,740 B2 | 7/2007 | Swift et al. |
| 2002/0052841 A1 | 5/2002 | Guthrie et al. |
| 2002/0069158 A1 | 6/2002 | Larkin et al. |
| 2003/0130919 A1 | 7/2003 | Templeton et al. |
| 2003/0140004 A1 | 7/2003 | O'Leary et al. |
| 2003/0172030 A1 | 9/2003 | Volgunin |
| 2003/0187786 A1 | 10/2003 | Swift et al. |
| 2003/0204457 A1 | 10/2003 | Arias |
| 2003/0204475 A1 | 10/2003 | Cuda |
| 2003/0212617 A1 | 11/2003 | Stone et al. |
| 2003/0213841 A1 | 11/2003 | Josephson |
| 2003/0217003 A1 | 11/2003 | Weinflash et al. |
| 2003/0225729 A1 | 12/2003 | Maloche et al. |
| 2004/0019605 A1 | 1/2004 | Keown et al. |
| 2004/0030644 A1 | 2/2004 | Shaper |
| 2004/0030649 A1 | 2/2004 | Nelson et al. |

(Continued)

OTHER PUBLICATIONS

Chapman, et al., "Controlling Financial Services Fraud", Australian Institution of Criminology Trends & Issues, No. 189, Feb. 2001.

(Continued)

Primary Examiner—Frantzy Poinvil
(74) Attorney, Agent, or Firm—Foley & Lardner LLP

(57) ABSTRACT

An exemplary method for reducing fraudulent transactions includes receiving fraud data from a first data source, wherein the fraud data is related to a fraudulent transaction of an entity. A first data element corresponding to the entity is also received from the first data source. The first data element is correlated with the fraudulent transaction of the entity to form an entity profile. The first data element and a second data element corresponding to the entity are received from a second data source. The second data element is correlated with the entity profile based on the first data element. A transaction risk assessment request based on a request for payment to a payee is received, wherein the transaction risk assessment request includes a payee identifier. A transaction risk assessment is generated based at least in part on the entity profile and at least in part on the payee identifier.

19 Claims, 3 Drawing Sheets

U.S. PATENT DOCUMENTS

| | | |
|---|---|---|
| 2004/0078328 A1 | 4/2004 | Talbert et al. |
| 2004/0153663 A1 | 8/2004 | Clark et al. |
| 2004/0210520 A1 | 10/2004 | Fitzgerald et al. |
| 2004/0236688 A1 | 11/2004 | Bozeman |
| 2006/0101508 A1 | 5/2006 | Taylor |
| 2006/0187698 A1 | 8/2006 | Schmidt et al. |
| 2006/0212407 A1 | 9/2006 | Lyon |
| 2007/0138257 A1 | 6/2007 | Dragt et al. |

OTHER PUBLICATIONS

FinCrime.com website, https://secure.fincrime.com/about_fcn.cfm, "Frequently Asked Questions," printed Nov. 15, 2007.

PR Newswire website, http://www.prnewswire.com/cgi-bin/stories.pl?ACCT=104&STORY=/www/story/02-10-2004/0002106277&EDATE=, "Mitek Introduces PADsafe Toolkit to Detect Preauthorized Draft Fraud," printed Nov. 15, 2007.

"New Fraud database to thwart rising fraud," *Computer Fraud & Security*, vol. 2002, No. 10, Oct. 2002, pp. 3.

Guerin-Calvert et al., "Merchant Benefits and Public Policy towards Interchange: An Economic Assessment," *Review of Network Economics*, vol. 4, Issue 4, Dec. 2005, pp. 384-414.

Affirmative Technologies website, http://www.affirmativeusa.com/check_verification_negitiva_database.htm, "Check Verification—Negative Database," printed Nov. 15, 2007.

BAI Online Website, http://www.bai.org/bankingstrategies/2006-may-june/PaymentsStrategies/Checks/index.asp, Hoffman, "Retailers' Role in the Demise of the Check," Published May 2006, printed Nov. 13, 2007.

First Data Corporation website, http://firstdata.com/product_solutions/payment_solutions/telecheck/eca_verification.htm ,"TeleCheck Electronic Check Acceptance® (ECA®) verification," printed Sep. 15, 2007.

e-check Solutions, Inc. website, http://www.echecksolutions.com/NCNVerify.htm, "Negative Database Check Verification," printed Sep. 15, 2007.

e-Solutions website, http://www.esolutionsoffice.com/checkverification/ "Check Verification, Verify Checks Before Accepting Them!", printed Sep. 15, 2007.

Mitek Systems, Inc., http://mail.miteksystems.com/pdf/FPS%20SDK%200206.pdf, "Image Based Forgery Detection You Need to Fight Check Fraud," printed Nov. 16, 2007.

Instamerchant.com website, http://www.instamerchant.com/avoid-credicard-fraud.html, "Stopping Fraud When Accepting Credit Cards Online," printed Nov. 13, 2007.

BioPay website, http://www.biopay.com/press-release-102303.asp, BioPay and Answers, Etc. Partner to Stop Check Fraud Nationwide, Oct. 23, 2003, printed Nov. 15, 2007.

Bank of America website, http://corp.bankofamerica.com/publicpdf/products/wcm_ar_fraud_check.pdf "Combating Fraud on Corporate Checking Accounts, a Bank of America White Paper," available Feb. 2004, printed Nov. 15, 2007.

CheckFree Corp. website, http://www.checkfreecorp.com/cda/corp/L5.jsp?layoutId=50020&contentId=46503&menuId=50059&pId=50021, "CheckFree FraudNet: Shared Intelligence for Increased Fraud Prevention," printed Nov. 15, 2007.

BAI Online website, http://www.bai.org/BANKINGSTRATEGIES/2006-MAY-JUNE/PaymentsStrategies/Smallbusiness/index.asp?WT.mc_id=BS_SEPTOCT06_MAYJUNE06_PSSMALLBUSINESS, Nagarkatte, "The Small Business Customer is Ready to Switch—for Payment Products," available May 2006, printed Sep. 15, 2007.

Instamerchant.com website, http://www.instamerchant.com/avoid-creditcard-fraud.html, "Stopping Fraud When Accepting Credit Cards Online," printed Sep. 15, 2007.

\* cited by examiner

METHOD, SYSTEM, AND COMPUTER-READABLE MEDIUM FOR REDUCING PAYEE FRAUD

FIELD

The subject of the disclosure relates generally to a method, system, and computer-readable medium for reducing payee fraud. More specifically, the disclosure relates to a negative payee database which retains profiles and assessments of negative payees such that an informed decision can be made regarding whether to grant a request for payment to a payee.

BACKGROUND

In the financial industry, a payee can refer to an individual or entity that is to receive payment from another individual or entity (i.e., the payor). The payor can initiate the payment through a paper check, an electronic transfer, over the telephone, or by any other method known to those in the financial industry. For example, a first payor may utilize an electronic transfer to provide a payment to a cable company payee for cable services. Similarly, a second payor may use a debit card to purchase a product from a department store payee. Unfortunately, there are many instances in which payees utilize fraudulent techniques to receive funds to which they are not entitled.

Fraudulent transactions can result in a loss of funds for an innocent payor and/or a financial institution such as a bank. As an example, a payor may use a network browser to locate a network (such as the Internet) based store which purports to sell electronic goods. Unbeknownst to the payor, the network based store may be a fake store which attempts to fraudulently accept payment for goods with no intent of ever delivering the goods to the payor. The payor can locate a good bargain on an electronic item within the network based store and use his/her bank issued debit card to pay for the electronic item over the network. The bank, which is also unaware that the store is a fake, can transfer funds from the payor's account to the fraudulent payee. As a result, the bank, the payor, or both have lost funds. There are numerous other examples of fraudulent financial transactions in which a fraudulent payee is able to receive undeserved funds.

Unfortunately, traditional fraud detection and prevention systems are not able to efficiently and effectively identify fraudulent acts on the part of payees. While disparate information regarding fraudulent acts of payees may exist, traditional systems are not able to organize and utilize the information to prevent future fraudulent acts from the same payee. Thus, there is a need for a fraud detection system which is able to utilize a plurality of sources to effectively identify fraudulent payees. Further, there is a need for a fraud prevention system which is able to effectively identify and deny financial transactions involving fraudulent payees.

SUMMARY

An exemplary method for reducing fraudulent transactions includes receiving fraud data from a first data source, wherein the fraud data is related to a fraudulent transaction of an entity. A first data element corresponding to the entity is also received from the first data source. The first data element is correlated with the fraudulent transaction of the entity to form an entity profile. The first data element and a second data element corresponding to the entity are received from a second data source. The second data element is correlated with the entity profile based on the first data element. A transaction risk assessment request based on a request for payment to a payee is received, wherein the transaction risk assessment request includes a payee identifier. A transaction risk assessment is generated based at least in part on the entity profile and at least in part on the payee identifier.

An exemplary computer-readable medium has computer-readable instructions stored thereon that, upon execution by a processor, cause the processor to receive fraud data from a first data source, wherein the fraud data is related to a fraudulent transaction of an entity. A first data element corresponding to the entity is also received from the first data source. The first data element is correlated with the fraudulent transaction to form an entity profile of the entity. The first data element and a second data element corresponding to the entity are received from a second data source. The second data element is correlated with the entity profile based on the first data element. A transaction risk assessment request is received based on a request for payment to a payee, wherein the transaction risk assessment request includes a payee identifier. A transaction risk assessment is generated based at least in part on the entity profile and at least in part on the payee identifier.

An exemplary system for reducing fraudulent transactions includes a profile generator and a payment module. The profile generator is configured to receive fraud data from a first data source, where the fraud data is related to a fraudulent transaction of an entity. A first data element corresponding to the entity is also received from the first data source. An entity profile is generated, wherein the entity profile comprises an association between the fraud data and the first data element. The first data element and a second data element corresponding to the entity are received from a second data source. The second data element is correlated with the entity profile based on the first data element. An entity profile risk assessment is generated for the entity profile, wherein the entity profile risk assessment is based at least in part on the fraud data. The payment module is configured to receive a transaction risk assessment request based on a request for payment, where the request for payment comprises a monetary request to a payee. The transaction risk assessment request includes a payee identifier corresponding to the payee. The payee identifier is compared to the entity profile to generate a confidence score. A transaction risk assessment is generated based at least in part on the entity profile risk assessment and at least in part on the confidence score.

Other principal features and advantages will become apparent to those skilled in the art upon review of the following drawings, the detailed description, and the appended claims.

BRIEF DESCRIPTION OF THE DRAWINGS

Exemplary embodiments will hereafter be described with reference to the accompanying drawings.

DETAILED DESCRIPTION

Described herein is a method, system, and computer-readable medium for reducing fraudulent financial transactions. A negative payee database or other storage mechanism can be used to store profiles of payees who have attempted fraudulent transactions, been associated with fraud, elicited questionable behavior, etc. in the past. Each payee in the negative payee database can have a profile associated with him/her/it. The profile can include one or more data elements (i.e., identifiers such as a name, alias, address, etc.) such that the payee can be identified in multiple ways. The profile can also include a risk assessment based on the number and/or severity of fraudulent transactions associated with the payee, the likelihood that the payee was involved in the fraudulent transaction, etc. Financial institutions can determine whether to grant a payment request to the payee based at least in part on the risk assessment.

Figure 1:
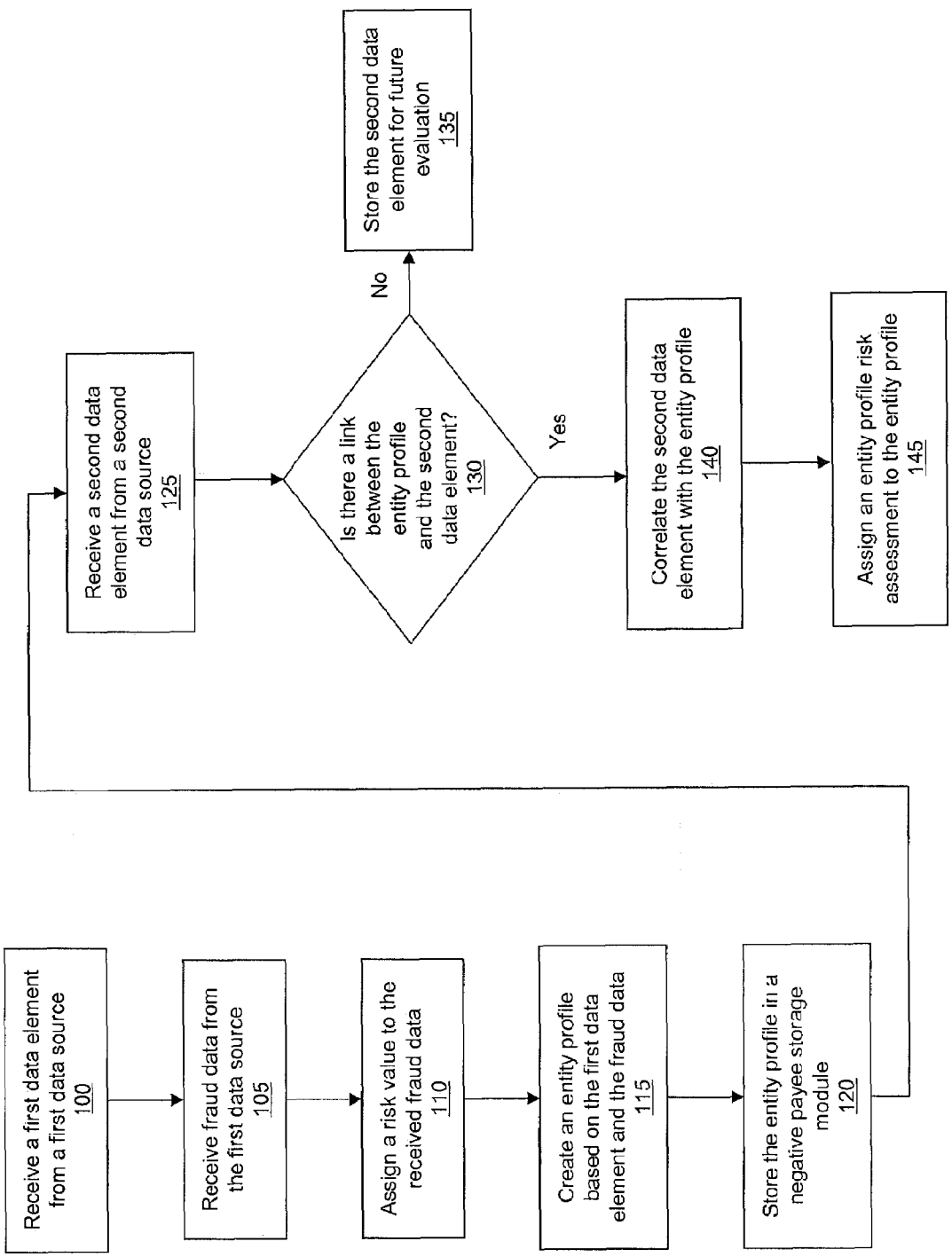
FIG. 1 is a flow diagram illustrating operations performed by a payee fraud reduction system in accordance with an exemplary embodiment.

FIG. 1 is a flow diagram illustrating operations performed by a payee fraud reduction system in accordance with an exemplary embodiment. In alternative embodiments, fewer, additional, or different operations may be performed. In an operation 100, a first data element is received from a first data source. The first data source may be a financial institution, the Office of Foreign Assets Control (OFAC), the United States Postal Inspection Service (USPIS), an internal countermeasure system (ICMS) of a corporate entity, a law enforcement agency, a dedicated fraud detection agency, a credit reporting agency, a consortium member, a private institution, or any other information source which accumulates reliable data regarding an entity. As used herein, entity can refer to a business such as a corporation, limited liability company, partnership, etc., or an individual.

In an exemplary embodiment, the first data element can be a piece of information associated with a particular entity/individual. For example, the first data element may be a name of the entity, an alias of the entity, a postal address of the entity, a delivery address of the entity, an entity type (i.e., individual, corporation, limited liability company, etc.), a telephone number of the entity, a fax number of the entity, a driver's license number of the entity, a state identification number of the entity, an account routing number of the entity, an account number of the entity, a social security number of the entity, a tax identification number of the entity, an e-mail address of the entity, an e-mail or web domain name of the entity, a credit card number of the entity, an Internet protocol (IP) address of the entity, known associates of the entity, an employer of the entity, a dollar amount of previous payments associated with the entity, and a familial relationship of the entity. Alternatively, the first data element can be any other type of information which can be used to help identify a given entity.

In an operation 105, payee fraud reduction system receives fraud data from the first data source. In an exemplary embodiment, the first data element and the fraud data may be received at the same time. For example, the first data source may provide the fraud data and a name (i.e., data element) associated with the fraud data. Alternatively, the first data source may provide the fraud data and a postal address associated with the fraud data. For example, the USPIS may provide a street address known to be used as a mail drop. The fraud data can be any information identifying a fraudulent act or transaction which was committed, a fraudulent act which was attempted, a criminal charge for a fraudulent act, a criminal conviction for a fraudulent act, an association with an entity that committed, attempted, was charged with, or was convicted of a fraudulent act, etc. The fraud data can also include any fraud factors regarding or associated with the fraudulent act. Examples of fraudulent acts may include financial account takeover or manipulation, pharming schemes, counterfeiting, kiting schemes, phishing schemes, bad check schemes, check alteration schemes, any other crimes of a financial nature or committed against a financial institution, and/or any other factors found to be a reliable indicator of fraud. In one embodiment, a plurality of fraud data items can be received. The plurality of fraud data items may have at least one data element in common.

In an operation 110, a risk value is assigned to the received fraud data. The risk value can be based on any of a number of fraud factors, including the type of fraudulent act indicated in the received fraud data, a severity of the fraudulent act, a role of the entity in the fraudulent act, the recentness of the fraudulent act, the reliability of the data source which provided the fraud data, and/or the likelihood that the fraudulent act was actually committed or attempted. In an exemplary embodiment, the fraud factors associated with the received fraud data can also be received from the first data source. Alternatively, the fraud factors may be provided from one or more other data sources. For example, a financial institution may provide information regarding the existence of a fraudulent act, and a law enforcement agency may provide specific details regarding the fraudulent act. In one embodiment, the risk value can be an accumulated point value, where a low risk value corresponds to low risk and a high risk value corresponds to high risk. The amount of points associated with the fraudulent act can be based on the fraud factors described above.

As an example, a first fraud factor may be the type of fraudulent act. Check alteration may be assigned a first point value, forgery may be assigned a second point value, establishment of a phishing website may be assigned a third point value, and so on. A second fraud factor can be the severity of the fraudulent act. Financial fraud of less than $100 may be assigned a first point value, fraud which is greater than or equal to $100 and less than $1000 may be assigned a second point value, fraud which is greater than or equal to $1000 and less than $10,000 may be assigned a third point value, and fraud which is greater than or equal to $10,000 may be assigned a fourth point value. A third fraud factor may be the role of the entity in the fraudulent act. Involvement as a sole perpetrator may be assigned a first point value, involvement as an accomplice may be assigned a second point value, involvement as a conspirator may be assigned a third point value, and so on. In addition, a family, work, or personal relationship with a fraudulent entity may be a assigned a point value. The point value(s) assigned for one or more relationships with fraudulent entities can be based on the number of such relationships and/or the closeness of such relationships. A fourth fraud factor may be the recentness of the fraudulent act. Fraudulent acts which took place in the last six months may be assigned a first point value, fraudulent acts which took place in the last year may be assigned a second point value, fraudulent acts which took place in the last 5 years may be assigned a third point value, and so on. A fifth fraud factor may be the likelihood that the alleged fraudulent act actually took place. For example, a first point value may be assigned to fraudulent acts for which a criminal conviction occurred, a second point value may be assigned to fraudulent acts for which a criminal charge was filed, a third point value may be assigned to fraudulent acts for which no criminal charge was filed, and so on. A sixth fraud factor may be the victim of the fraudulent act. For example, if the system is maintained by a financial institution, a first point value may be assigned if the fraudulent act was against the financial institution, a second point value may be assigned if the fraudulent act was against any other financial institution, and a third point value may be assigned if the fraudulent act was against a non-financial institution. Alternatively, the system may be maintained and used by a consortium having a plurality of consortium members. In such an embodiment, a first point value may be assigned if the fraudulent act was against a specific consortium member, a second point value may be assigned if the fraudulent act was against any other consortium member, a third point value may be assigned if the fraudulent act was against a financial institution which is not a consortium member, and a fourth point value may be assigned if the fraudulent act was against a non-financial institution which is not a consortium member. In an alternative embodiment, any other factors may be considered for determination of the risk value.

In an exemplary embodiment, the points attributed to each of the fraud factors associated with the fraudulent act can be added or otherwise mathematically manipulated to obtain the risk value. If information regarding a particular fraud factor is unavailable, a default value may be used. The default value can be zero, or any other predetermined value. In one embodiment, the default value associated with the unknown fraud factor may be based on other known fraud factors. For example, if the recentness of the fraudulent act is unknown, a first default point value for the recentness factor may be used if the amount at issue was less than $100, and a second default point value may be used if the amount at issue was greater than $10,000. In an alternative embodiment, any other type of point and/or scoring system may be used to obtain the risk value of a fraudulent act.

In an operation 115, an entity profile based on the first data element and the fraud data is created. In an exemplary embodiment, the entity profile can be an association between the fraud data and the first data element. As described in more detail below, the entity profile can also include other data elements associated with the entity such that the likelihood of identification of the entity is increased. The other data elements can be obtained from a plurality of distinct data sources. In an operation 120, the entity profile is stored in a negative payee storage module. The negative payee storage module can be a database or any other type of storage module known to those of skill in the art.

In an operation 125, a second data element is received from a second data source. In one embodiment, the second data element may be received in response to a data element request. For example, the payee fraud reduction system (or system) may receive the first data element and the fraud data from the first data source. The system can issue a data element request to one or more data sources in an attempt to expand the entity profile of the entity. In an exemplary embodiment, additional data elements can increase the likelihood that the entity will be identified during a financial transaction. As an example, an entity profile may only include fraud data and a street address as a result of a fraudulent act committed by an individual A at the street address. With such a limited entity profile, individual A may still be able to conduct financial transactions without detection by the system. However, if the entity profile also includes individual A's name, the system can be on alert that individual A has been involved with a fraudulent act. In an alternative embodiment, the second data element may be received as a random or scheduled information update from the second data source.

In an operation 130, the system determines whether there is a link between the entity profile and the second data element. In an exemplary embodiment, the system can include a plurality of entity profiles corresponding to a plurality of entities. The link can be identified by searching the plurality of entity profiles to locate common data elements. For example, the first data source may provide information regarding a fraudulent transaction (i.e., fraud data) that was committed by John Doe, and an entity profile corresponding to John Doe and the fraud data can be created. The data elements provided by the second data source may include the name John Doe and a street address where John Doe lives. The system can search the plurality of entity profiles to identify the name John Doe as a link between the information provided from the first data source and the information provided from the second data source. In an exemplary embodiment, the system may use an additional verification procedure to ensure that the John Doe living at the street address is the same John Doe from the entity profile.

If a link exists between the entity profile and the second data element(s) received from the second data source, the second data element(s) are correlated with the entity profile in an operation 140. As a result, the updated entity profile is more likely to flag a financial transaction involving John Doe. If a link does not exist between the entity profile, the second data element(s) are stored for future evaluation in an operation 135. The future evaluation can be conducted when additional entity profiles are created by the system to ensure that the entity profiles include a maximal number of data elements associated with the entity. Alternatively, the second data element(s) may be discarded if a link is not found. In an exemplary embodiment, the first data element can be provided with the second data element, and the first data element can be used to link the second data element to the entity profile.

In an exemplary embodiment, the entity profile may include a plurality of fraudulent acts associated with the entity. Fraud data regarding the plurality of fraudulent acts may be received from one or more data sources. In an operation 145, the system can assign an entity profile risk assessment to the entity profile. The entity profile risk assessment can be based at least in part on the number of fraudulent transactions associated with the entity profile and the risk values assigned to each of the fraudulent transactions. The entity profile risk assessment may also be based on the reliability of the data elements associated with the profile entity, the reliability of the data sources which provided the data elements, and/or the likelihood that the data elements are actually associated with the entity. As an example, a first entity profile may have a first fraudulent act, a second fraudulent act, and three data elements associated therewith. The entity profile risk assessment of the first entity profile can be based on a risk value of the first fraudulent act, a risk value of the second fraudulent act, the reliability of the data source(s) which provided the information regarding the fraudulent acts, the number of data elements associated with the entity profile, the likelihood that the data elements are correctly associated with the entity profile, and/or the reliability of the data source(s) which provided the data elements. In an exemplary embodiment, the entity profile risk assessment can be used to help determine whether a given request for payment to a payee should be granted or denied. In alternative embodiments, any other method(s) may be used to assign the entity profile risk assessment to the entity profile.

In one embodiment, the entity profile risk assessment may be determined in real time upon receipt of a request for payment to a payee. In such an embodiment, the entity profile risk assessment can be determined as part of a transaction risk assessment which is used to ultimately determine whether a request for payment should be granted. In addition to the factors described above, the transaction risk assessment can be based on payee identifiers which are associated with the payee. For example, the transaction risk assessment can be based on the number of payee identifiers which match data elements from the entity profile. A larger number of matching pairs can imply a higher probability that the payee corresponds to the entity from the entity profile. The transaction risk assessment can also be based on the degree of similarity between the payee identifiers and the data elements from the entity profile. For example, the system can recognize that the names 'Bob' and 'Robert' have a high degree of similarity, even though they have a different spelling. The degree of commonality of the payee identifier and/or the data element it is compared to can also be a factor upon which the transaction risk assessment is based. For example, a payee identifier name of 'John Smith' which matches the name 'John Smith' in an entity profile may be accorded less weight than a match of the name 'Jebediah Crunch.'

Figure 2:
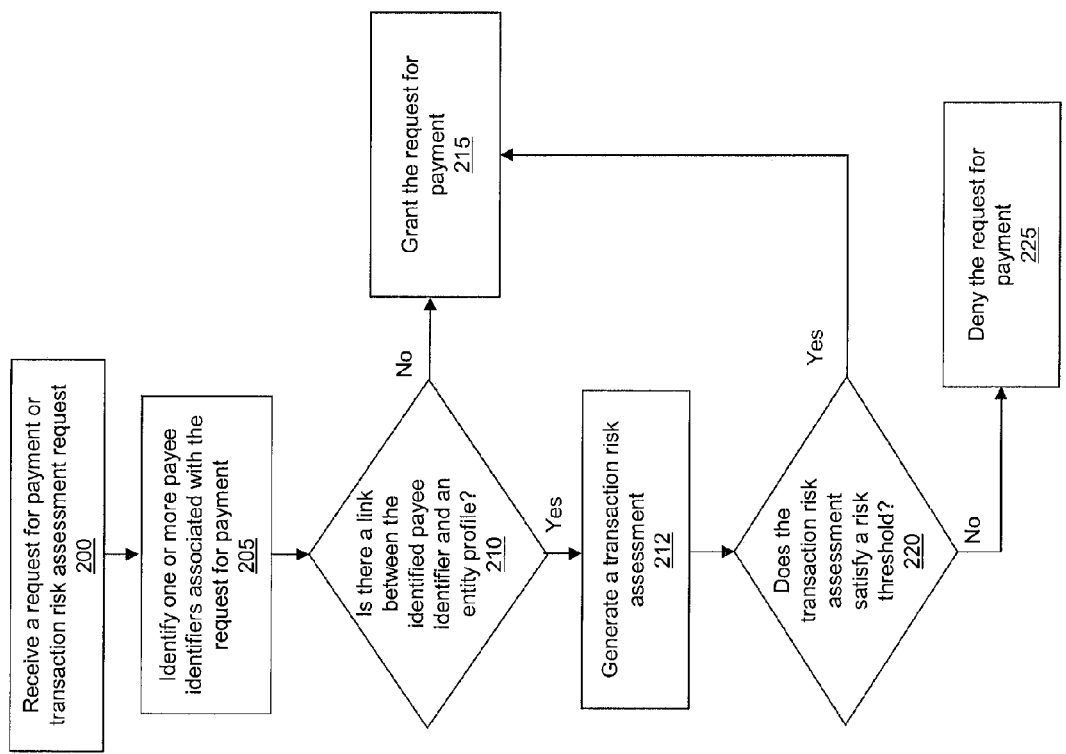
FIG. 2 is a flow diagram illustrating operations performed by the payee fraud reduction system in response to a request for payment in accordance with an exemplary embodiment.

FIG. 2 is a flow diagram illustrating operations performed by the payee fraud reduction system in response to a request for payment in accordance with an exemplary embodiment. In alternative embodiments, fewer, additional, or different operations may be performed. In an operation 200, a request for payment or transaction risk assessment request is received by the system. In an exemplary embodiment, the request for payment can be initiated by a payor through a channel of a financial institution. For example, the request for payment may be a request by the payor to transfer owed funds to a payee. Alternatively, the request for payment may be initiated by the payee (i.e., the payee may attempt to cash a check or otherwise receive funds from the payor), or by any other institution designated to receive requests for payment and forward them to the system. The channel of the financial institution can be any payment origination channel through which funds can be transferred to a payee. For example, the channel may be a telephone banking channel, an Internet (or network) banking channel, a wire transfer channel, an account-to-account transfer channel, a bill pay channel, a money order transaction channel, an automated clearinghouse (ACH) channel, a paper check transaction channel, an inter-bank transfer channel, a person-to-person channel, a mobile payment channel, etc.

In one embodiment, the system may be incorporated within the financial institution such that the request for payment is automatically received by the system upon receipt by the financial institution. Alternatively, the system may be maintained by a separate entity which is distinct from the financial institution. In such an embodiment, the system can provide fraud detection and payment recommendation services to a plurality of financial or other institutions (i.e., a consortium), and/or receive fraud data and data elements from members of the consortium. Alternatively, the system may receive a transaction risk assessment request based on a request for payment. The transaction risk assessment request can include one or more payee identifiers associated with the request for payment. In an exemplary embodiment, the transaction risk assessment request can be provided by a financial or other institution which receives the request for payment. Alternatively, any other requester, including the payee, can provide the transaction risk assessment request.

In an operation 205, one or more payee identifiers associated with the request for payment are identified. In an exemplary embodiment, the potential categories of payee identifiers can correspond to the potential categories of data elements as described with reference to FIG. 1. For example, the name of the payee can be a first payee identifier which potentially corresponds to a name data element, an address of the payee can be a second payee identifier which potentially corresponds to an address data element, a telephone number of the payee can be a third payee identifier which potentially corresponds to a telephone number data element, and so on. Alternatively, the payee identifier can be any other type of information which can be used to associate a payee with an entity profile. The payee identifier(s) can be provided by the payee and/or the payor depending on the type of financial transaction and the banking channel through which the financial transaction is conducted.

In an operation 210, the system determines whether there is a link between the identified payee identifier(s) and any of the entity profiles accessible to the system. The process for determining whether a link exists can be similar to the process for identifying links between data elements and entity profiles as described above with reference to FIG. 1. The plurality of entity profiles can be searched to determine whether the identified payee identifier(s) match any data elements associated with any of the entity profiles. If a plurality of payee identifiers have been received, the system can search for each of the payee identifiers within the entity profiles. If the system does not find a match between a payee identifier and a data element associated with an entity profile, the system can grant the request for payment in an operation 215. Alternatively, the system may just notify the requestor that no matches were found. In an exemplary embodiment, if one or more links are found, a confidence value can be determined. The confidence value, which may be a percentage, can be the likelihood that a payee associated with the request for payment is the entity associated with an entity profile. The confidence value can be based on the number of payee identifiers which match an entity profile and/or the quality of the matches.

If a link between the payee identifier and one or more entity profiles is identified, the system generates a transaction risk assessment in an operation 212. In an exemplary embodiment, a transaction risk assessment can be generated for each entity profile for which a link was identified in operation 210. The transaction risk assessment(s) can be generated in real time, and can be based on any risk value(s) and/or an entity profile risk assessment associated with the entity profile(s) as described with reference to FIG. 1. The transaction risk assessment(s) can be also based on the confidence value (i.e., the likelihood that the payee actually corresponds to the entity associated with the entity profile). If multiple entity profiles are identified as being linked to a payee, the system can generate an individual transaction risk assessment for each identified entity profile. In one embodiment, the plurality of individual transaction risk assessments can be averaged to determine the transaction risk assessment. Alternatively, if the confidence value is the same (or similar) for a plurality of entity profiles, the entity profile risk assessments of the plurality of entity profiles may be averaged, and the average multiplied by the confidence value (or average confidence value) to obtain the transaction risk assessment. Alternatively, the transaction risk assessment may be the highest individual risk assessment, the lowest individual risk assessment, a median individual risk assessment, or based on any other mathematical manipulation(s) of the plurality of individual risk assessments.

As a numerical example, the entity profile risk assessment may be expressed as a value between 0 (low risk) and 100 (high risk). A particular entity profile may have an entity profile risk assessment of 65, and a payee associated with a request for payment or transaction risk assessment request may match the particular entity profile with a confidence value of 83%. The transaction risk assessment, which may be obtained by multiplying the entity profile risk assessment and the confidence value, can be 53.95. In alternative embodiments, the entity profile risk assessment may be expressed in any other terms. In other alternative embodiments, any other mathematical manipulation(s) may be used to obtain the transaction risk assessment. The transaction risk assessment may also be based on any other values or factors. In one embodiment, the transaction risk assessment may be a predetermined value which does not consider the likelihood that the payee identifiers correspond to the entity profile.

The system determines if the transaction risk assessment(s) satisfy a risk threshold in an operation 220. The risk threshold can be determined by the system, one or more financial institutions, a governmental entity, or any other source. In one embodiment in which the system serves a plurality of financial institutions, different financial institutions may have different risk thresholds. If the risk threshold is satisfied for all of the entity profiles for which a link was identified, the system grants the request for payment in operation 215. Alternatively, the system may just notify the bank that the risk threshold is satisfied for all identified entity profiles. If the risk threshold is not satisfied for any of the identified entity profiles, the system denies the request for payment in an operation 225. In an alternative embodiment, the system may provide the transaction risk assessment to a financial institution or other system user, and the financial institution (or other system user) can make the decision of whether to grant or deny the request for payment. In one embodiment, the transaction risk assessment may be used as a factor within the system user's larger fraud reduction system, and the larger fraud reduction system can make the decision regarding whether to grant or deny the request for payment. It is important to understand that the system described herein is not limited to use by financial institutions. The system can also be used by department stores, decoupled debit card providers, and/or any other businesses or individuals that initiate payments. In an exemplary embodiment, any of the operations performed by the system can be embodied as instructions stored in a computer-readable medium. Upon execution of the instructions by a processor, the instructions can cause the processor to perform the above-described operations. In one embodiment, the system may provide an audit report which identifies a reason for the denial of the request for payment or a reason for the unfavorable transaction risk assessment. The audit report may identify the fraudulent act(s) of the payee, the data source(s) which provided fraud data corresponding the fraudulent act(s), and/or any other information relevant to the transaction risk assessment.

Figure 3:
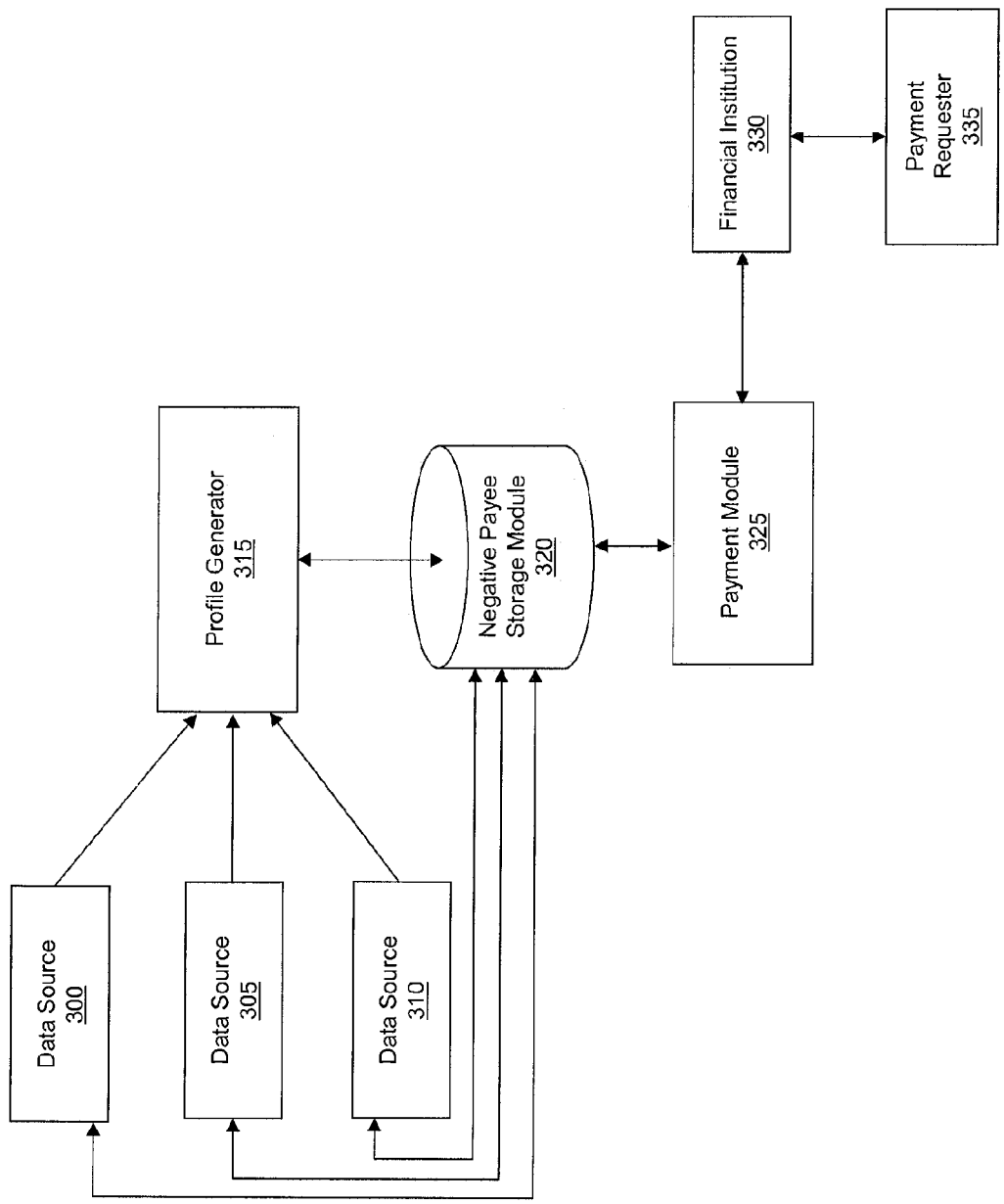
FIG. 3 is a block diagram illustrating a payee fraud reduction system in accordance with an exemplary embodiment.

FIG. 3 is a block diagram illustrating a payee fraud reduction system in accordance with an exemplary embodiment. A first data source 300, a second data source 305, and a third data source 310 can provide data elements and/or fraud data to a profile generator 315 of the payee fraud reduction system (system). The data elements and/or fraud data can also be provided to a negative payee storage module 320. Profile generator 315 can receive data element(s) and fraud data corresponding to a given entity. Profile generator 315 can use the data element(s) and fraud data to create an entity profile which can be stored in negative payee storage module 320. Profile generator 315 can also assign a risk value to individual fraudulent transactions and/or assign an entity profile risk assessment to the entity profile. In addition, profile generator 315 can identify links between existing entity profiles and additional data elements which are received from first data source 300, second data source 305, and third data source 310. If links are identified, profile generator 315 can update the entity profiles accordingly.

Payment module 325 can receive requests for payment from a financial institution 330. Alternatively, the requests for payment may be received from an entity, such as a governmental entity or a corporation, which is not a financial institution. Financial institution 330 can receive the request for payment from a payment requester 335. Payment requester 335 may be a payee or a payor depending on the transaction. In an exemplary embodiment, the request for payment can be a request for a funds transfer from the payor to the payee. Payment module 325 can identify payee identifier(s) associated with the payee of the request for payment, and determine whether the identified payee identifier(s) match any data elements associated with an entity profile. If no matches (or links) are identified, payment module 325 can grant the payment request or simply inform financial institution 330, depending on the embodiment. If there are any entity profiles with a data element which matches one or more payee identifiers of the payee, payment module 325 can generate a transaction risk assessment for each of the identified entity profiles. Depending on the embodiment, payment module 325 may also be used to generate risk values and/or entity profile risk assessments for profile entities stored in negative payee storage module 320. Payment module 325 can compare the transaction risk assessment with a risk threshold to determine whether the risk threshold is satisfied. If the risk threshold is satisfied, payment module 325 can grant the request for payment or inform financial institution 330 that the request for payment has been cleared. If the risk threshold is not satisfied, payment module 325 can deny the request for payment or inform financial institution 330 that there is a problem. Financial institution 330 can inform payment requester 335 whether the request for payment is allowed or denied. Alternatively, financial institution 330 can receive the transaction risk assessment and make a determination whether to grant or deny the request for payment based at least in part on the transaction risk assessment.

In one embodiment, the system of FIG. 3 can also include a reviewer for reviewing denied requests for payment. Incorrect denials of payment can cause problems for customers of financial institution 330 (i.e., a deadline for payment of a bill may be missed), and can result in a negative reputation for financial institution 330. The reviewer can be an individual who manually reviews the denied requests and makes a final decision based on additional research and/or previous knowledge. For example, a denial of payment may be based on a street address which was associated with a fraudulent act of an entity. The reviewer may be able to determine that the entity which committed the fraudulent act has moved and that the new resident (i.e., the payee of the current request for payment) has no association with fraud. In such an instance, the reviewer can also ensure that the entity profile stored in negative payee storage module 320 is updated to reflect the change of address. In an alternative embodiment, the payor may be notified of a potential fraudulent payee and asked whether he/she/it would like to proceed with the transaction.

As an example using the system of FIG. 3, the second data source 305 can be a fraud information firm dedicated to collecting information regarding fraudulent transactions, and the third data source 310 can be an internal data source within financial institution 330. The fraud information firm can provide profile generator 315 with information regarding a fraudulent act that was associated with a particular Internet protocol (IP) address. The internal data source, which can be a customer database of financial institution 330, can provide information regarding a telephone number and a street address associated with the IP address. Profile generator 315 can use the fraudulent act and the IP address to generate an entity profile surrounding the fraudulent act. Profile generator 315 can use the IP address to link the street address to the entity profile. Profile generator 315 can also use the street address to link the telephone number to the entity profile. Profile generator 315 can also use fraud factors associated with the fraudulent act to generate a risk value for the fraudulent act and/or an entity profile risk assessment for the entity profile. The entity profile can be stored in negative payee storage module 320.

Continuing the example from above, payment requester 335 can be a payor who uses a debit card to pay a payee for an online purchase of goods. The request for payment can result from the debit card transaction. Financial institution 330 can be a bank which manages the financial accounts of the payor and receives the request for payment. The request for payment to the payee can include at least a financial account number of the payee, a company name of the payee, a street address of the payee, and a telephone number of the payee. The bank can submit the request for payment, including the payee identifiers (i.e., the financial account number, company name, street address, and telephone number of the payee) to payment module 325.

Payment module 325 can perform a search of negative payee storage module 320 to determine whether any of the payee identifiers match any data elements stored within negative payee storage module 320. Payment module 325 can determine that the street address of the payee matches the street address contained in the above-described entity profile. Payment module 325 can generate a confidence score based on the likelihood that the payee is the entity associated with the entity profile. Based at least in part on the confidence score and the entity profile risk assessment of the entity profile, payment module 320 can generate a transaction risk assessment for the request for payment. If the transaction risk assessment does not satisfy a risk threshold used by the bank, payment module 320 can deny the request for payment. In one embodiment, a reviewer can review the denial for request for payment to help ensure that the denial is not in error. If the transaction risk assessment for the entity profile satisfies the risk threshold, the request for payment can be granted.

One or more flow diagrams have been used to describe exemplary embodiments. The use of flow diagrams is not meant to be limiting with respect to the order of operations performed. The foregoing description of exemplary embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method for reducing fraudulent transactions, the method comprising the computer implemented steps of:
   receiving fraud data from a first data source, wherein the fraud data is related to a fraudulent transaction of an entity;
   receiving a first data element corresponding to the entity from the first data source;
   correlating the first data element with the fraudulent transaction of the entity to form an entity profile;
   receiving the first data element and a second data element corresponding to the entity from a second data source;
   correlating the second data element with the entity profile based on the first data element;
   generating an entity profile risk assessment associated with the entity profile;
   receiving a transaction risk assessment request based on a request for payment to a payee, wherein the transaction risk assessment request includes a payee identifier;
   comparing the payee identifier to the entity profile to generate a confidence score; and
   generating a transaction risk assessment based at least in part on the entity profile risk assessment and at least in part on the confidence score.

2. The method of claim 1, wherein the first data source comprises at least one of a financial institution, a government institution, a corporation, a consortium member, or a private institution.

3. The method of claim 1, further comprising storing the entity profile in a negative payee storage module.

4. The method of claim 1, wherein the first data element comprises at least one of a name of the entity, an alias of the entity, a postal address of the entity, a delivery address of the entity, an entity type, a telephone number of the entity, a fax number of the entity, a driver's license number of the entity, a state identification number of the entity, an account routing number of the entity, an account number of the entity, a social security number of the entity, a tax identification number of the entity, an e-mail address of the entity, a web domain name of the entity, a credit card number of the entity, an Internet protocol (IP) address of the entity, or a relationship of the entity.

5. The method of claim 1, further comprising granting the request for payment only if the transaction risk assessment satisfies a risk assessment threshold.

6. The method of claim 1, wherein the request for payment comprises at least one of a money order request, a wire transfer request, or an automated clearinghouse request.

7. The method of claim 1, further comprising providing an audit report, wherein the audit report identifies a reason for a denial of the request for payment.

8. The method of claim 7, wherein the audit report further identifies the first data source.

9. The method of claim 1, wherein the transaction risk assessment request is received from a financial institution.

10. The method of claim 1, wherein the entity profile risk assessment is based at least in part on the fraudulent transaction.

11. The method of claim 10, further comprising receiving one or more fraud factors associated with the fraudulent act, wherein the entity profile risk assessment is based at least in part on the one or more fraud factors.

12. A computer-readable medium having computer-readable instructions stored thereon that, upon execution by a processor, cause the processor to:
   receive fraud data from a first data source, wherein the fraud data is related to a fraudulent transaction of an entity;
   receive a first data element corresponding to the entity from the first data source;
   correlate the first data element with the fraudulent transaction to form an entity profile of the entity;
   receive the first data element and a second data element corresponding to the entity from a second data source;
   correlate the second data element with the entity profile based on the first data element;
   generate an entity profile risk assessment associated with the entity profile;
   receive a transaction risk assessment request based on a request for payment to a payee, wherein the transaction risk assessment request includes a payee identifier;
   generate a confidence score based at least in part on the payee identifier; and
   generate a transaction risk assessment based at least in part on the entity profile risk assessment and at least in part on the confidence score.

13. The computer-readable medium of claim 12, wherein the processor is further caused to determine whether to grant the request for payment based on the transaction risk assessment.

14. The computer-readable medium of claim 13, wherein determining whether to grant the request for payment comprises comparing the transaction risk assessment to a risk assessment threshold.

15. The computer-readable medium of claim 12, wherein the payee identifier is received from a requestor that provided the request for payment.

16. The computer-readable medium of claim 12, wherein the processor is further caused to store the entity profile in a negative payee storage module, wherein the negative payee storage module comprises a plurality of entity profiles.

17. The computer-readable medium of claim 12, wherein the transaction risk assessment request is received from the payee.

18. A system for reducing fraudulent transactions, the system comprising:
   a profile generator configured to
      receive fraud data from a first data source, wherein the fraud data is related to a fraudulent transaction of an entity;
      receive a first data element corresponding to the entity from the first data source;
      generate an entity profile, wherein the entity profile comprises an association between the fraud data and the first data element;
      receive the first data element and a second data element corresponding to the entity from a second data source;
      correlate the second data element with the entity profile based on the first data element; and
      generate an entity profile risk assessment for the entity profile, wherein the entity profile risk assessment is based at least in part on the fraud data; and
   a payment module configured to
      receive a transaction risk assessment request based on a request for payment, wherein the request for payment comprises a monetary request to a payee, and further wherein the transaction risk assessment request includes a payee identifier corresponding to the payee;
      compare the payee identifier to the entity profile to generate a confidence score; and
      generate a transaction risk assessment based at least in part on the entity profile risk assessment and at least in part on the confidence score.

19. The system of claim 18, further comprising a negative payee storage module configured to receive and store the entity profile.

* * * * *